No. 787,906. PATENTED APR. 25, 1905.
L. B. EBERLY.
GRAIN SHOCKING MACHINE.
APPLICATION FILED FEB. 29, 1904.

No. 787,906. PATENTED APR. 25, 1905.
L. B. EBERLY.
GRAIN SHOCKING MACHINE.
APPLICATION FILED FEB. 29, 1904.

Witnesses

Inventor
Levi B. Eberly
By Obed C. Billman
His Attorney

No. 787,906. Patented April 25, 1905.

UNITED STATES PATENT OFFICE.

LEVI B. EBERLY, OF SMITHVILLE, OHIO.

GRAIN-SHOCKING MACHINE.

SPECIFICATION forming part of Letters Patent No. 787,906, dated April 25, 1905.

Application filed February 29, 1904. Serial No. 195,728.

*To all whom it may concern:*

Be it known that I, LEVI B. EBERLY, a citizen of the United States, residing at Smithville, in the county of Wayne and State of Ohio, have invented certain new and useful Improvements in Grain-Shocking Machines, of which the following is a specification.

My invention relates to improvements in grain-shocking machines; and the paramount object of the invention is to provide a simple, efficient, and practical machine of this class which will be better adapted to its intended purposes than any other machine of the same class with which I am acquainted and which may be readily attached to any harvester-binder now in use without in any way altering the construction thereof.

The invention has for its object to provide a machine for receiving the grain in bundles from the harvester-binder or like apparatus and accumulating the same in proper form upon a tilting platform until a sufficient quantity is gathered to form a shock, tilting the platform automatically by the weight of the shock or manually at any time desired by the driver, and automatically discharging or pushing off from said tilting platform the completed shock in its proper upright position by means of suitable shock forming and discharging or pushing mechanism thrown into engagement or gear by means of the tilting platform with suitable gearing actuated by the main driving-wheel of the machine.

With these ends in view the invention consists in the novel construction, arrangement, and combination of parts hereinafter described, illustrated in the accompanying drawings, and particularly pointed out in the appended claims.

Referring now to the drawings forming a part of this specification.

Similar characters of reference indicate like parts throughout all the figures of the drawings.

Referring to the drawings, 1 designates the frame of the machine, comprising suitable beams formed at the side, at the top and bottom, and connected and supported by means of vertical beams 2.

3 designates laterally-extending arms provided at their ends with hinge-eyes 4, adapted to be hingedly attached to the adjacent frame of the binder in any suitable and convenient manner, by means of which the machine is attached to the binder, and a chain 5 may be extended from one side of the machine and connected to the tongue or other suitable part of the binder.

6 designates a tilting platform pivotally attached at its front, as at *a*, in any suitable manner to the cross-beam 1ª and designed to be automatically tilted when a sufficient number of sheaves have been accumulated to form a shock by means of the mechanism hereinafter described.

7 designates a lever attached at one end to the free end of the platform 6 and at the other to one of the side beams 1 of the machine.

8 designates a bar connected at its lower end to the lever 7 and at its upper end attached to end of a second lever 9, pivotally mounted on a pivot post or bracket 10, secured to an inclined track 11, over which moves the end of an arm of the shock discharging or moving mechanism, to be hereinafter described. Upon the free end of the lever 9 there is slidably and adjustably mounted a balance-weight 12, by means of which the weight of any shock desired to tip the platform 6 may be regulated.

13 designates guides between which the free end of the lever 9 moves and which are fastened at their lower ends to the side beam 1.

Figures 5, 6:
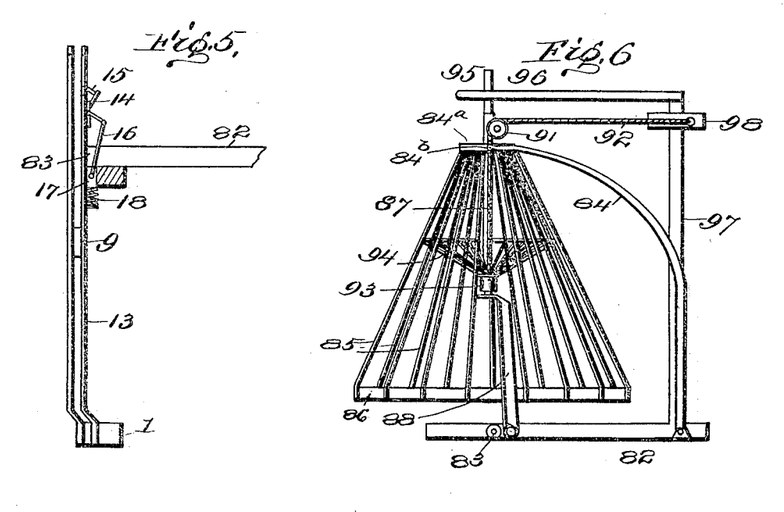
Fig. 5 is a detail view of mechanism for actuating mechanism connected to the tilting platform and actuated by one of the arms of the shock-discharging mechanism.
Fig. 6 is a side view of the top-forming mechanism attached to the arms of the shock-discharging mechanism.

14 designates a bell-crank pivotally mounted on the inner side of the inner guide 13, as shown in Fig. 5 of the drawings, and carrying at its upper end a wooden pin 15, mounted therein and adapted to take into an opening formed in the guide 13 adjacent thereto.

16 designates a rod secured at its upper end to the lower arm of said bell-crank and secured at its lower end to the free end of a lever 17, pivotally mounted at the side of the inclined track 11.

18 designates a spring mounted beneath the lever 17 and adapted to move said lever upwardly when the end of the arm of the discharging or moving mechanism has moved off of it in its downward movement in discharging a shock, moving the bell-crank 14 and sticking the wooden pin 15 in front of the end of the elevated lever 9, for the purpose to be hereinafter described.

19 designates a shaft mounted in suitable bearings secured to the front portion of the frame of the machine and provided with the main driving-wheel 20, provided with the usual ratchet mechanism for imparting motion to said shaft 19 when the same is moved forward. It will be understood that this driving-wheel 20 may be mounted on the inner end or middle portion of the shaft 19 instead of on the outer end, as shown, if found more desirable with reference to side draft, &c.

21 designates a gear-wheel mounted on the shaft 19 and meshing with a second gear-wheel 22, mounted on the lower end of a vertical shaft 23, mounted in suitable bearings secured to the front of the frame of the machine.

Figure 4:
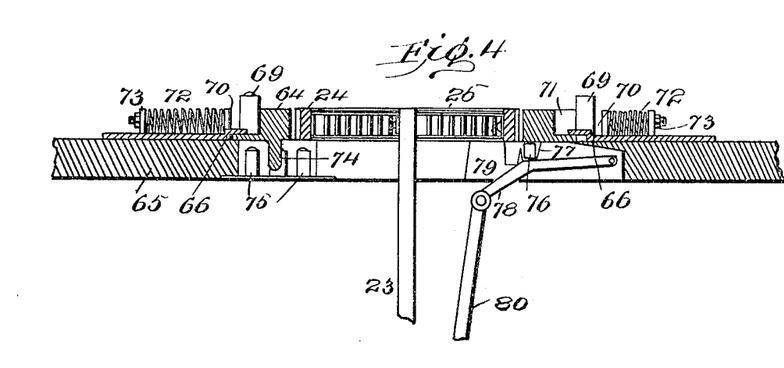
Fig. 4 is a detail transverse sectional view taken through line *a b* of Fig. 1.

24 designates a gear wheel or pinion loosely mounted on the upper end of the vertical shaft 23 and secured thereto by means of a coil-spring 25, (see Fig. 4,) mounted within said gear wheel or pinion 24 and having one of its ends secured to the inner periphery of the pinion 24 and the other secured to vertical shaft 23 for the purpose of allowing a certain limited elastic motion of said pinion on the shaft when suddenly thrown into engagement with the adjacent toothed rack, to be hereinafter described.

26 designates a second gear-wheel mounted on the shaft 19, and 27 designates a horizontal shaft mounted in suitable bearings 28, secured to the base-beams 29 and provided with a gear-wheel 30, meshing with gear-wheel 26.

31 designates a bevel-gear secured to shaft 27 and meshing with a bevel-gear 32, loosely mounted on a horizontal shaft 33, mounted in suitable bearings attached to the laterally-extending arms 3.

34 designates a bevel-gear attached to the end of horizontal shaft 27 and meshing with a bevel-gear 35, mounted on a shaft 36, mounted in suitable bearings attached to laterally-extending arms 3.

37 designates a bevel-gear attached to inner end of shaft 36 and meshing with a bevel-gear 38, secured at the lower end of a vertical shaft 39, carrying at its upper end a series of packer-arms 40, pivotally secured at their inner ends to said shaft 39 and adapted to receive motion from the same.

41 designates a stationary circular friction-track disposed, substantially as shown, about shaft 39 and designed to act as a guide for the packer-arms 40, causing the free ends of the same to assume varying planes in their revolution in feeding the butt-ends of the sheaves to the bottom of the path of sheaves and to the conveyers, to be hereinafter described.

42 designates two horizontal beams forming the top of the frame of the sheath-path and designed to support the upper ends of the vertical shafts 43, mounted in suitable bearings therein on each side of said sheaf-path.

44 designates crank-arms formed near the upper and lower ends of said vertical shafts 43 and carrying a pair of horizontally-disposed feeding-bars 45.

46 designates a series of wire spring-fingers arranged along the inner sides of the horizontally-disposed feeding-bars 45 and the stationary horizontal beams 42 and designed to assist said feeding-bars 45 in carrying the sheaves along in the sheaf-path in their proper upright position to the shock-forming mechanism hereinafter described.

47 designates a series of spring-arms mounted at the inner end of the horizontal beam 42 and designed to receive the tops of the sheaves as discharged from the binder and turn the same into a vertical position preparatory to entering and being moved forward along the sheaf-path by and between the horizontally-disposed feeding-bars 45.

48 designates a horizontally-disposed rock-shaft provided with a ball-and-socket or universal joint 49 and journaled in suitable bearings along the rear of the machine and provided at its outer end with a crank-arm 50, which takes into a boxing 51, fastened at one side of the rear of the tilting platform 6, as shown, and which, it will be observed, by reason of the particular construction will allow the platform to be moved up or down automatically when the crank-arm 50 is in position shown in drawings without moving the rock-shaft 48. Furthermore, should it be desired to lower or raise the tilting platform 6 manually at any time desired by moving the rock-shaft 48, so that the crank-arm 50 will come into contact with the bottom of the tilting platform 6, thrusting the same downwardly, and by moving the same in an opposite direction, so that the crank-arm 50 will come into contact with the upper side of the boxing 51, the platform may be raised and the rock-shaft 48 then returned to its normal position, as shown in the drawings, allowing automatic tilting of the platform 6.

52 designates a crank-arm formed at the inner end of the rock-shaft 48, to which is attached a rod 53, moved by an operating-lever 53ª, secured at its lower end to a bracket 54, secured at some suitable place on the binder, so as to be within ready reach of the driver.

Figure 10:
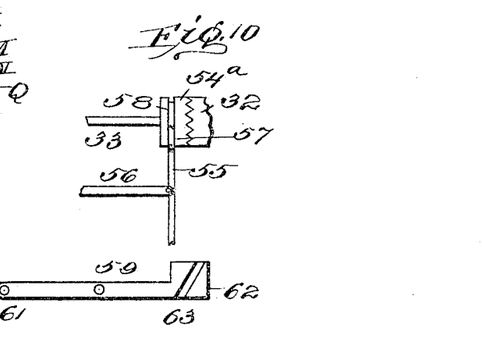
Fig. 10 is a detail view of the shifting mechanism for throwing a part of the machine into and out of gear when the tilting platform is operated.
Figure 11:
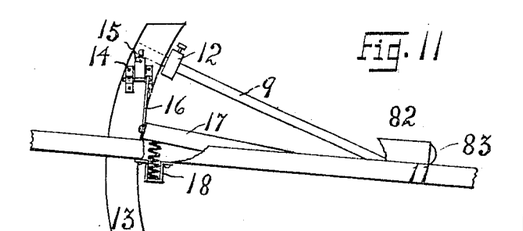
Fig. 11 is a detail view of one of the levers and its connections for locking the platform in its tilted position when a shock is being discharged.
Figure 12:
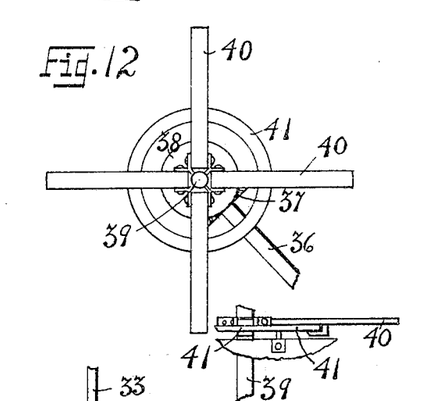
Fig. 12 is a detail view of the packer-arms and their connections for moving the sheaves into the sheaf-path as discharged from the binder.
Figure 13:
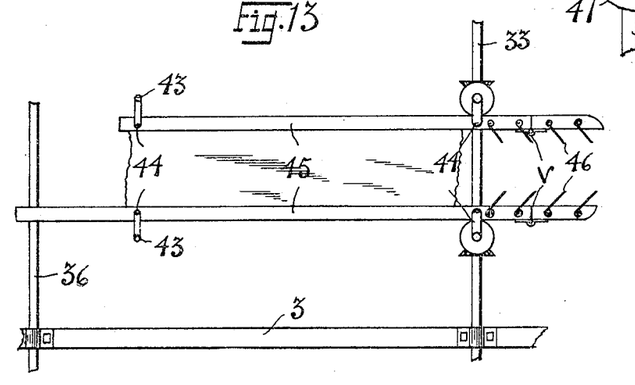
Fig. 13 is a detail view of the horizontally-disposed feeding-bars and their connections arranged along the sheaf-path.
Figure 14:
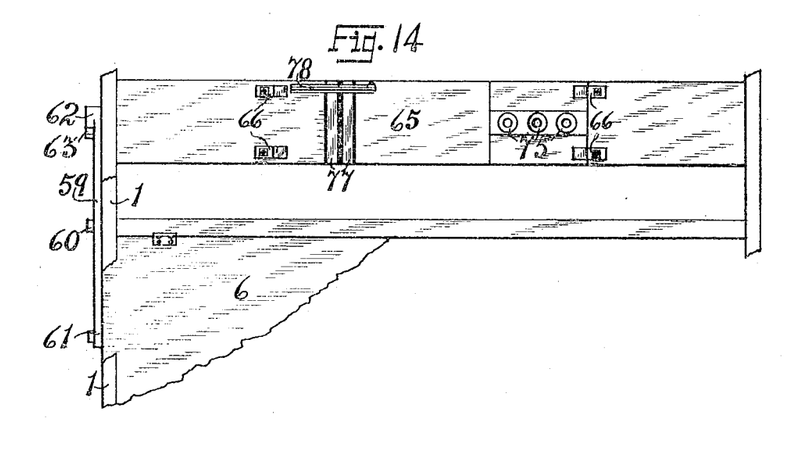
Fig. 14 is a top plan view of the supporting-plate upon which the shock-discharging mechanism is mounted.
Figure 15:
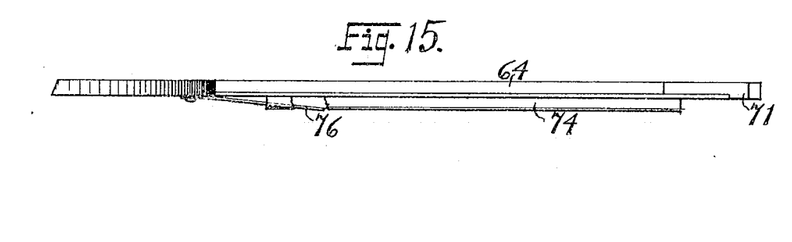
Fig. 15 is a side view of the rack of the shock-discharging mechanism.

54ª designates a clutch member secured to the shaft 33, adjacent to bevel-gear 32, loosely mounted thereon and adapted to be thrown into and out of engagement or gear with said bevel-gear 32 by being moved laterally on said shaft 33 by means of a shifting lever 55, pivoted in a bracket 56 and having one end forked into two arms, forming a yoke 57, which take into an annular groove or recess 58, formed in said clutch member 54ª. (See Fig. 10.) The clutch member 54ª, like gear wheel or pinion 24, is attached to the shaft 33 by means of a coil-spring, (not shown in drawings,) for obvious reasons.

59 designates a lever pivoted to one of the side beams 1 of the frame by means of a pin 60 and secured at one end 61 to the tilting platform 6 and at the other end provided with a block or head 62, having an inclined groove or recess 63, adapted to receive the free end of the lever 55 and shift the same when the lever 59 has been depressed by the dropping or tilting of the platform 6.

64 designates a rack mounted upon a supporting-plate 65 and held in position by means of clips 66 and a cross-bar 67, supported by a suitable frame and provided with a roller 68, which takes under the rack 64, as shown.

69 designates rollers secured at the front or inner ends of the supporting-bars 70, slidably mounted upon the supporting-plate on each side of the rack 64 and adapted to travel and bear upon the inclines 71, arranged upon the sides of said rack 64, near each end thereof, by means of the coil tension-springs 72, for the purpose hereinafter set forth.

73 designates adjusting-nuts, by means of which the tension of said springs 72 may be regulated.

74 designates a downwardly-extending tongue or flange arranged along one side of said rack 64 (see Fig. 4) and designed to pass between a series of friction-rollers 75, suitably mounted in the supporting-plate 65 and adapted to maintain said rack 64 in contact with the gear wheel or pinion 24 after having been shifted, as hereinafter described.

76 designates a downwardly-extending spring-tongue arranged upon the opposite side of the rack 64, near the front end thereof, and adapted to take into two grooves 77, formed in the supporting-plate 65. This spring-tongue 76 is adapted by reason of its contact with the inner groove 77 to hold said rack in its normal position out of contact with the gear wheel or pinion 24, as shown in drawings, while a shock is being formed and is adapted to be pressed upwardly out of engagement with said groove by means of the upward thrust of the lever 78, which takes under the same, thus leaving the rack 64 free to be shifted into engagement with the gear wheel or pinion 24 by reason of the pressure of the adjacent roller 69 and coil tension-spring 72 against the incline 71 of the rear end of the rack. The lever 78 is pivotally mounted at one end in a groove or recess 79 of the supporting-plate 65, as shown, and at its free end is pivotally attached to a vertical bar 80, which said bar is connected at its lower end with a lever 81, secured to the front end of the tilting platform 6.

82 designates two pusher-arms formed with the front portion of the rack 64 and adapted to take about the shock at or a little above the bands of the sheaves forming the same.

83 designates a roller mounted on the end of the outer arm 82 and adapted to move along the inclined track 11 and depress and release the lever 17, attached along said track, as hereinbefore referred to.

84 designates inwardly and upwardly extending supporting-arms attached to the pusher-arms 82, carrying at their ends a pivotally-mounted shock-forming and top-compressing mechanism described as follows: The top portion consists of a ring 84ª, pivotally secured at its sides by means of pivots 84ᵇ, to the ends of said supporting-arms 84 and provided with a series of pivotally-mounted downwardly and outwardly extending arms 85, carrying at their outer or lower ends an annular strong elastic rubber band 86.

87 designates a vertical post pivotally supported and secured at its lower end by means of pivots 87ª and supporting-arms 88, secured at their base ends to the ends of the pusher-arms 82. The post 87 extends upwardly and through an elongated slot 89, formed within the ring forming the top portion of the top-compressing mechanism, and is held in its normal position, as shown, by means of a coil-spring 90, interposed between one end of said slot 89 and the side of said post 87.

91 designates a pulley mounted near the top of said post and over which passes a cord 92, which cord is secured at its lower end to a ferrule 93, slidably mounted on said post and provided with a series of pivotally-mounted radially-extending supporting-arms 94, pivotally secured at their outer ends to the arms 85, hereinbefore referred to.

95 designates a vertical latch-bar pivotally attached to the post 87 and designed to engage the ferrule 93 when the latter has been elevated in the discharge of a shock and designed to release the same by coming into contact with the horizontal bar 96 upon return of the shock-discharging mechanism.

97 designates a vertical bar or post secured to the front of the frame of the machine and carrying at its top said horizontal bar 96 and a spring-actuated winding drum or spool 98 for automatically paying out and winding up the cord 92 when the shock-discharging mechanism is being operated.

Figure 8:
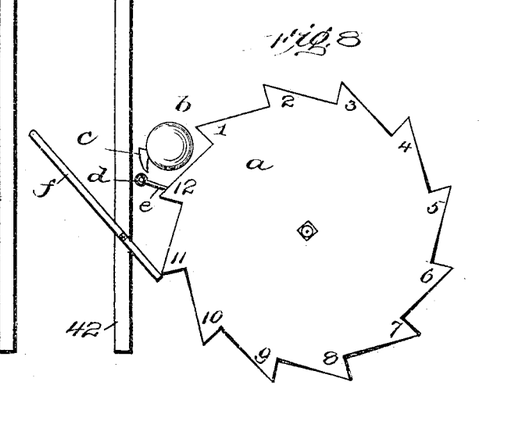
Fig. 8 is a top plan view of mechanism for indicating the number of sheaves of grain which have passed into the shock-forming mechanism.

In Fig. 8 is shown a view of a mechanism which may be attached along the sheaf-path for indicating the number of sheaves which have passed into the shock-forming mechanism. It consists, essentially, of a horizontally-disposed pivotally-mounted disk $a$, suitably mounted along the sheaf-path and provided about its perimeter with twelve notches, numbered consecutively from "1" to "12." $b$ designates a stationary bell mounted on a post just outside the periphery of the disk $a$, and $c$ designates a fixed cam or incline suitably mounted near the bell $b$. $d$ designates a hammer mounted upon the end of a spring-arm $e$, which spring-arm is carried by and attached to the disk $a$ near the notch marked "12," and is adapted to come into engagement with the fixed cam or incline $c$, springing the same outwardly, and after passing the same springs inwardly, striking said bell $b$ with the hammer $d$ and ringing the same when twelve sheaves have passed into the shock-forming mechanism. $f$ designates a swinging horizontal bar pivotally mounted at one side of the sheaf-path and adapted to be moved by each sheaf as it passes, and the inner end taking into one of the notches of the disk $a$, moving the same one notch forward for each sheaf that has passed. A spring returns the bar $f$ to its initial position after a sheaf has passed, as shown in the drawings.

Figure 9:
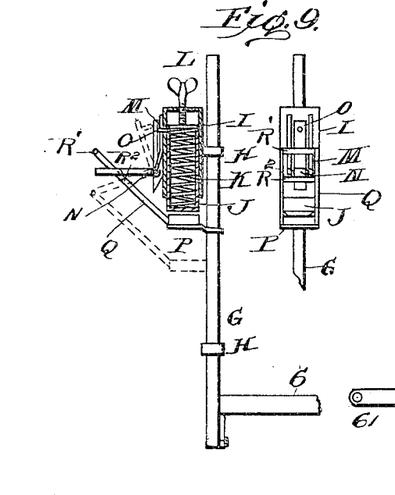
Fig. 9 is a detail view of depressing mechanism which may be attached to the rear corner of the tilting platform for insuring the automatic tilting of the platform.

In Fig. 9 is shown a detail view, partly in section, of a depressing mechanism which may be attached to the corner of the tilting platform 6, if found necessary or desirable, for insuring the automatic tilting of the platform.

G designates a vertical rod slidably attached to the rear frame of the machine by means of staples or straps H and pivotally attached at its lower end to the rear corner of the tilting platform 6.

I designates a fixed boxing secured to the rear frame of the machine, which fixed boxing I is adapted to take over a second boxing J, slidably mounted therein and containing a coiled compressing-spring K, interposed between the closed ends of said boxings.

L designates a thumb-screw for regulating the tension of said compressing-springs K.

M designates two spring-arms attached at their upper ends to the fixed boxing I and provided at their lower ends with bearings carrying the trunnions of a bell-crank N, carrying in its upper arm a fixed pin O, adapted to register with and take into an opening of the boxings I and J when the platform 6 is in its elevated position, as shown in the drawings.

P designates a fixed bracket secured to the vertical rod G and adapted to be engaged and depressed by the lower end of the boxing J when released by the means hereinafter described.

Q designates two upwardly and outwardly extending arms secured at their lower ends to the fixed bracket P and carrying at their upper and outer ends two cross-bars $R'$ and $R^2$.

It will be observed that when the platform 6 starts to drop the bracket P and attached arms Q will be moved to the position indicated by the dotted lines, and the outer cross-bar $R'$, having engaged the outer end of the bell-crank N, will move the same to position indicated by the dotted lines, pulling the fixed pin O, thus releasing the inner boxing J, which is thrust downwardly, striking the bracket P and forcing the same, with the attached platform, down. The object of this mechanism is to overcome the resistance to the dropping of the platform 6 at this point, caused by the throwing into gear of the mechanisms hereinbefore referred to. When the platform 6, with the attached rod G, bracket P, and arms Q, are returned to their initial position, the outer cross-bar $R'$ will clear the end of the bell-crank N; but the inner cross-bar $R^2$ will engage it and return it to its initial position, as shown.

Figure 1:
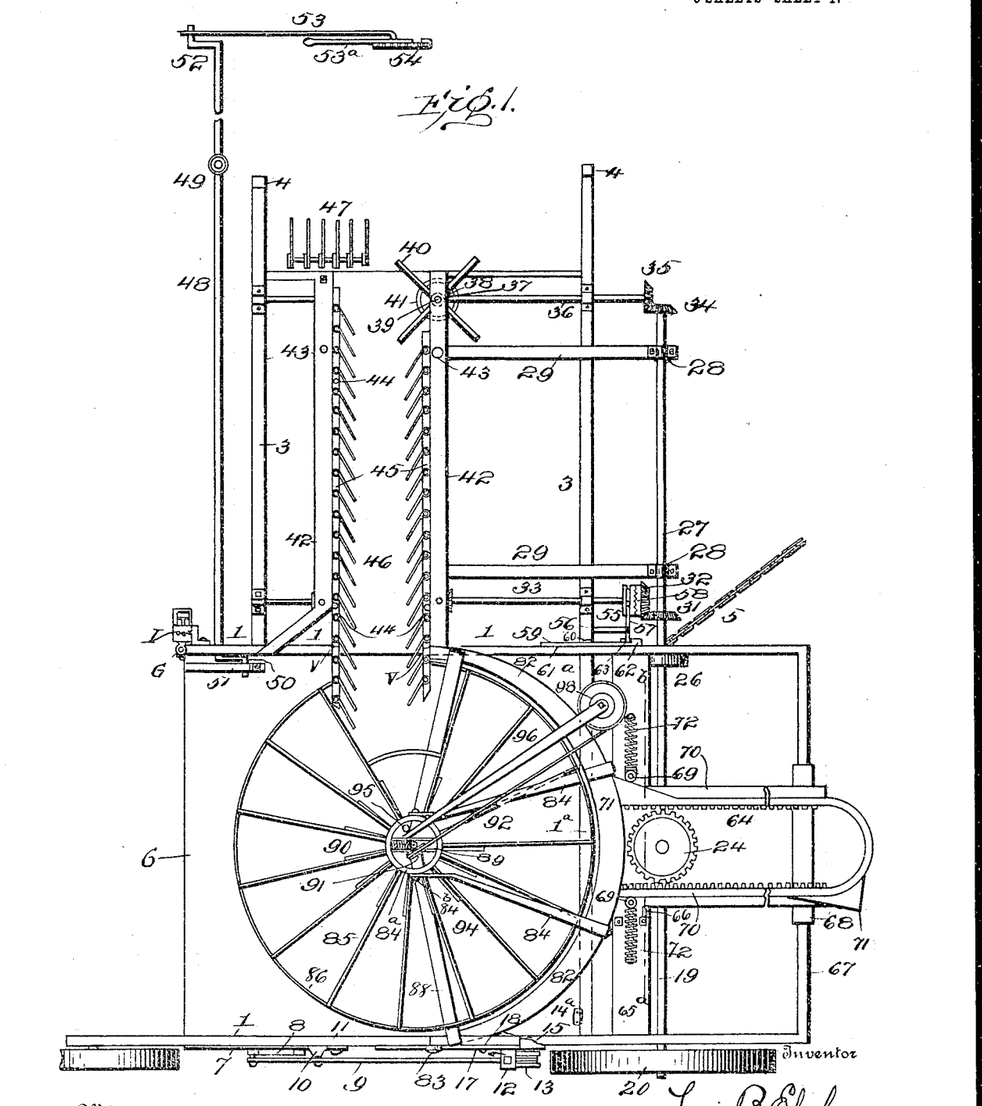
Figure 1 is a top plan view of my invention detached from the harvester-binder and with the parts ready to receive the bundles of grain as delivered from the binder and form the same into a shock.
Figure 2:
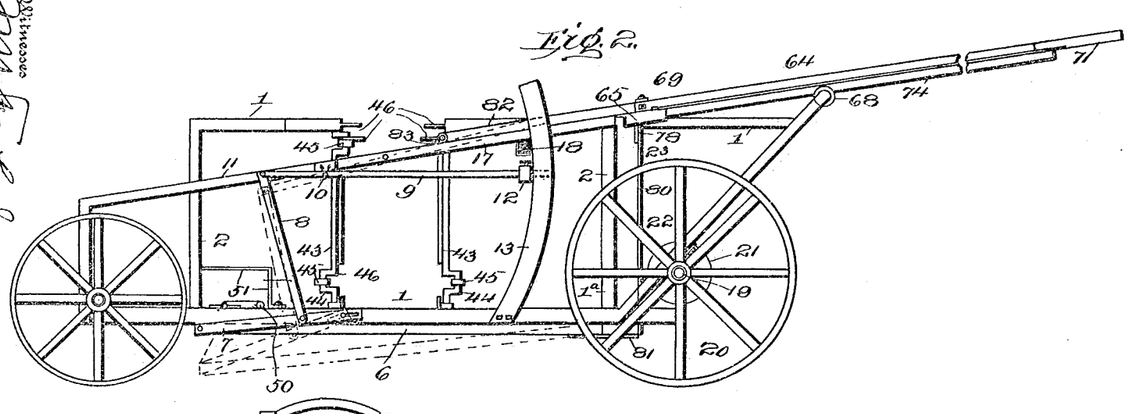
Fig. 2 is a side view of the same with the top-forming mechanism detached.
Figure 3:
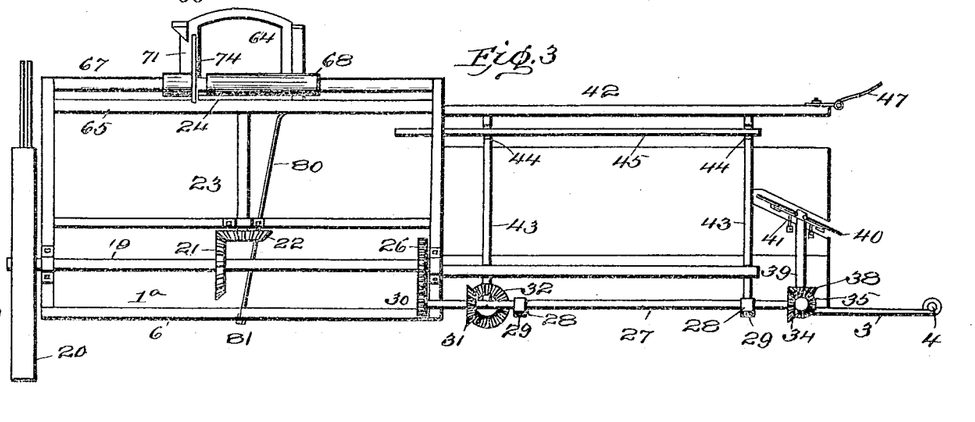
Fig. 3 is a front view of the same.
Figure 7:
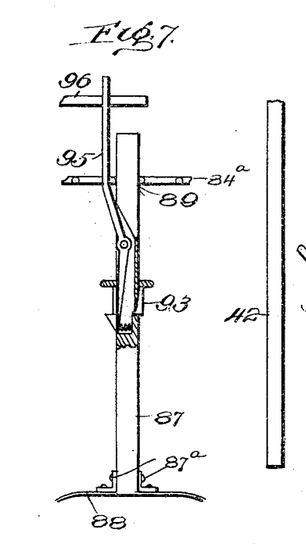
Fig. 7 is a detail view of the locking or latching mechanism attached to the top-forming mechanism.

Having described the various parts of my invention, its operation is as follows: As the sheaves are delivered from the binder their tops fall upon the spring-arms 47, and their butts being unsupported are thus brought to assume a nearly vertical position at the entrance to the sheaf-path, with the butts resting upon the bottom of the same. They are then further moved forward by the action of the packer-arms 40 and engaged by the spring-fingers 46 of the horizontally-disposed feeding-bars 45 and are moved along the sheaf-path in a vertical position upon the tilting platform 6 and into the shock-forming and top-compressing mechanisms. As the sheaf is conveyed along the sheaf-path it will engage the swinging horizontal bar *f*, moving the disk *a* one notch forward, and when the twelfth sheaf has passed the bell *b* will be rung, as hereinbefore explained, and the driver may tilt the platform 6, manually, if desired, by means of the lever 53ª, which manipulates the rock-shaft 48, provided with the crank-arm 50, which contacts with the bottom of the tilting platform 6, thrusting the same downwardly. The sheaves enter between the arms 85 of the top-compressing mechanism, at the lower ends of which the rubber band 86 does not extend, and when the shock is first being formed the arms 85 by the action of the rubber band 86 have assumed a nearly vertical position. As the sheaves are forced in by the feeding-bars 45 the rubber band 86, with arms 85, gradually expand, maintaining a uniform constant pressure upon the outside of the top portion of the sheaves while the shock is being formed. When a shock has been completed, the shock forming and compressing mechanism has assumed a position like that shown in Fig. 1 of the drawings, and the weight of the shock tilts the platform 6, as shown by the dotted lines of Fig. 2, raising the weighted lever 9, thrusts the vertical bar 80, with attached lever 78, upwardly, permitting the coil tension-spring 72, compressed by the incline 71 near the rear end of the rack 64, to shift said rack laterally into engagement with the moving gear wheel or pinion 24, and said rack 64, with the attached pusher-arms 82, and the shock-forming and compressing mechanism holding the shock in its proper upright position, slides and pushes the shock off rearwardly from the inclined tilted platform 6 at exactly the same rate as the machine is moving forwardly. In the tilting of the platform the shifting bar or lever 55 throws the clutch member 54ª out of gear or engagement with bevel gear or pinion 32, loosely mounted on the shaft 33, so that the feeding-bars 45 are not in motion to feed any sheaves onto the platform 6 while the shock discharging and forming mechanism is in the act of discharging a shock. The platform 6 being tilted, the weighted lever 9 is elevated, and as soon as the end of the outer pusher-arm 82 has passed off of the pivoted spring-actuated lever 17 the latter will raise and insert wooden pin 15 below the end of the weighted lever 9 until the shock discharging and forming mechanism has returned to its normal or initial position, when the weighted lever 9 drops, the pin 15 being withdrawn, raising the platform 6 to its elevated position and said platform throwing the mechanism operating the feeding-bars 45 into gear to feed sheaves for the next shock. As the shock discharging and forming mechanism moves rearwardly the cord 92 is paid out by the spring-actuated winding-spool 98 until the forward end of the rack 64 is within about one foot of the bevel gear or pinion 24, when the cord 92 by reason of a knot or cross-bar therein is paid out no further by the spool 98, and the same therefore raises the ferrule 93, raising the arms 85 upwardly and outwardly, stretching the rubber band 86 and releasing the top of the shock as discharged from the machine upon the ground. When the top-compressing mechanism has been thus elevated, the ferrule 93 is engaged by the latch-bar 95, as shown most clearly in Fig. 7, holding the same in its elevated position until the return of the shock discharging and forming mechanism to its initial position, when the top of the latch-bar is moved laterally by contact with the end of the horizontal bar 96, releasing said ferrule 93 and permitting said top-compressing mechanism to return to its initial position by the contraction of the rubber band to receive sheaves for the next shock. When the front end of the rack 64 has about reached the gear or pinion 24, the roller 69 travels up the incline 71 at the front of the rack 64, and the rack is immediately shifted laterally and immediately returned to its initial position by means of the gear or pinion 24 having engaged the adjacent side of said rack.

It will be observed that the ends of the feeding-bars 45 are pivoted, as at V, and provided with springs, so that when a shock is being discharged they may be moved rearwardly, but will return to their normal position by the action of said springs.

Various changes in the form, proportion, and the minor details of construction may be resorted to without departing from the principles or sacrificing any of the advantages of this invention.

Having thus explained the nature of my invention and described a way of constructing and using the same, although without having attempted to set forth all the forms in which it may be made or all the modes of its use, I declare that what I claim, and desire to secure by Letters Patent, is—

1. A grain-shocking machine, consisting of a suitable frame, a tilting platform pivotally attached to said frame, a shock forming and discharging mechanism mounted above said tilting platform, means for operating said shock forming and discharging mechanism when said platform is tilted, mechanism for receiving sheaves from the binder and tilting the same to an upright position and moving and feeding the same in said upright position to said shock forming and discharging mechanism, and means connected to said tilting platform for throwing said last-mentioned mechanism into and out of operation when said platform is operated.

2. In a grain-shocking machine, the combination with a U-shaped rack and pinion, and pusher-arms formed at the ends of said rack to discharge the shock; of a top-compressing mechanism attached to and mounted above the ends of said pusher-arms, and means for raising and releasing said top-compressing mechanism when the shock is discharged.

3. In a grain-shocking machine, the combination with a tilting platform, a shock-discharging mechanism mounted above said tilting platform, and means for operating said tilting platform and shock-discharging mechanism; of a top-compressing mechanism mounted above said tilting platform and attached to said shock-discharging mechanism, and means for raising and releasing said top-compressing mechanism when a shock is discharged.

4. In a grain-shocking machine, the combination with a tilting platform, and means for moving the shock rearwardly in an upright position on said tilting platform to discharge it therefrom; of top-compressing mechanism attached to and mounted above said means for moving the shock rearwardly, and means for raising and releasing said top-compressing mechanism when a shock is discharged.

5. In a grain-shocking machine, the combination with means for receiving and tilting the sheaves to a vertical position as received from the binder, means for feeding the sheaves in a vertical position to a tilting platform, a tilting platform suitably mounted, and a shock-discharging mechanism mounted above said tilting platform; of a shock-forming and top-compressing mechanism attached to said shock-discharging mechanism, and means for operating and releasing said shock-forming and top-compressing mechanism when a shock is discharged.

6. In a grain-shocking machine, the combination with a tilting platform and sheaf-feeding mechanism; of a shock-discharging mechanism mounted above said tilting platform, and means for operating said mechanism and throwing said sheaf-feeding mechanism out of operation when the platform is tilted.

7. A shock-forming and top-compressing mechanism for grain-shocking machines, consisting of a ring pivotally mounted above a platform, a series of downwardly and outwardly extending arms pivotally secured to said ring, an annular elastic band secured to the outer or lower ends of said arms, a recess or opening formed in said band between two of said arms, a vertical post pivotally mounted and supported at its base end and extending upwardly within said ring, a ferrule slidably mounted upon said vertical post, a series of radially-extending supporting-arms secured to said ferrule and pivotally secured at their outer ends to said outwardly-extending arms, and means for raising and releasing said arms when a shock is discharged.

8. In a grain-shocking machine, the combination with a tilting platform, and a shock-discharging mechanism mounted above said tilting platform; of a top-compressing mechanism attached to said shock-discharging mechanism, and means for raising and releasing said top-compressing mechanism when a shock is discharged.

9. A shock-discharging and top-compressing mechanism for grain-shocking machines, consisting of a tilting platform, a rack and pusher-arms adapted to discharge the shock rearwardly when the platform is tilted, a top-compressing mechanism attached to said pusher-arms, and means for raising and releasing said top-compressing mechanism when a shock is discharged.

10. In a shock-forming and top-compressing mechanism for grain-shocking machines, the combination with a tilting platform, a ring pivotally mounted above the platform, a series of downwardly and outwardly extending arms pivotally secured to said ring, an annular elastic band secured to the outer or lower ends of said arms, and a vertical post pivotally mounted and extending upwardly within said ring; of a ferrule slidably mounted upon said vertical post, a series of radially-extending supporting-arms secured to said ferrule and pivotally secured at their outer ends to said outwardly-extending arms, and means for raising and releasing said arms.

11. A grain-shocking machine, consisting of a suitable frame, a tilting platform pivotally attached to said frame, a shock forming and discharging mechanism mounted above said tilting platform, means for operating said shock forming and discharging mechanism when said platform is tilted, means for receiving sheaves from the binder and tilting and moving the same in a vertical position to a series of horizontally-disposed feeding-bars, a series of horizontally-disposed feeding-bars suitably mounted and interposed between said means for receiving, tilting, and moving the sheaves from the binder and said shock forming and discharging mechanism, and means for throwing said last-mentioned mechanism into and out of operation when said platform is operated.

12. In a grain-shocking machine, the combination with a tilting platform pivotally attached to a frame, a shock forming and discharging mechanism mounted above said tilting platform, and means for operating said shock forming and discharging mechanism when said platform is tilted; of means for receiving sheaves from the binder and tilting and moving the same in a vertical position to a series of feeding-bars, a series of horizontally-disposed feeding-bars suitably mounted and interposed between said means for receiving, tilting, and moving the sheaves from the binder and said shock forming and discharging mechanism, and means for throwing said feeding-bars out of operation when said platform is tilted.

13. In a grain-shocking machine, the combination with a series of horizontally-disposed feeding-bars suitably mounted, and a tilting platform suitably mounted at the ends thereof, and means for throwing said feeding-bars out of operation when the platform is tilted; of a shock forming and discharging mechanism mounted at the ends of said feeding-bars and adapted to form the sheaves in a vertical position on a tilting platform, and means for operating said shock forming and discharging mechanism when said platform is tilted.

14. In a grain-shocking machine, the combination with a tilting platform, and means for operating the same; of means for receiving and moving the sheaves from the binder to said platform in a vertical position, a shock-discharging and top-compressing mechanism suitably mounted above said tilting platform, means for operating said shock-discharging mechanism when the platform is tilted, and means for raising and releasing said top-compressing mechanism when a shock is discharged.

15. In a grain-shocking machine, the combination with a shock-forming and top-compressing mechanism, consisting of a ring pivotally mounted above a platform, a series of downwardly and outwardly extending arms pivotally secured to said ring, an annular elastic band secured to the outer or lower ends of said arms, a recess or opening formed in said band between two of said arms, a vertical post pivotally mounted and supported at its base end and extending upwardly within said ring, a ferrule slidably mounted upon said vertical post, a series of radially-extending supporting-arms secured to said ferrule and pivotally secured at their outer ends to said outwardly-extending arms, and means for raising and releasing said arms when a shock is discharged; of a tilting platform suitably mounted immediately beneath said shock-forming and top-compressing mechanism, means for tilting and moving the sheaves from the binder in a vertical position, and a series of horizontally-disposed feeding-bars suitably mounted and interposed between said shock-forming mechanism and said means for tilting the sheaves when discharged from the binder.

16. In a grain-shocking machine, the combination with a shock-forming and top-compressing mechanism, consisting of a ring pivotally mounted, a tilting platform suitably mounted beneath said shock-forming and top-compressing mechanism, a series of downwardly and outwardly extending arms pivotally secured to said ring, an annular elastic band secured to the outer or lower ends of said arms, a recess or opening formed in said band between two of said arms, a vertical post pivotally mounted and supported at its base end and extending upwardly within said ring, a ferrule slidably mounted upon said vertical post, a series of radially-extending supporting-arms secured to said ferrule and pivotally secured at their outer ends to said outwardly-extending arms, and means for raising and releasing said arms when a shock is discharged; of a series of horizontally-disposed feeding-bars suitably mounted and adapted to convey the sheaves in a vertical position to said shock-forming and top-compressing mechanism, and means for throwing the same out of operation when the platform is tilted.

In testimony whereof I have affixed my signature in presence of two witnesses.

LEVI B. EBERLY.

Witnesses:
   OBED C. BILLMAN,
   JOSEPH GALLAGHER.